US011970891B2

(12) United States Patent
Folie

(10) Patent No.: US 11,970,891 B2
(45) Date of Patent: Apr. 30, 2024

(54) ASSEMBLY COMPRISING A FURNITURE HINGE AND A COVERING

(71) Applicant: Julius Blum GmbH, Hoechst (AT)

(72) Inventor: Thomas Folie, Dornbirn (AT)

(73) Assignee: Julius Blum GmbH, Hoechst (AT)

( * ) Notice: Subject to any disclaimer, the term of this patent is extended or adjusted under 35 U.S.C. 154(b) by 74 days.

(21) Appl. No.: 17/838,470

(22) Filed: Jun. 13, 2022

(65) Prior Publication Data

US 2022/0307302 A1 Sep. 29, 2022

Related U.S. Application Data

(63) Continuation of application No. PCT/AT2020/060449, filed on Dec. 11, 2020.

(30) Foreign Application Priority Data

Dec. 19, 2019 (AT) .............................. A 51122/2019

(51) Int. Cl.
*E05D 11/00* (2006.01)
*E05D 5/02* (2006.01)

(52) U.S. Cl.
CPC ........ *E05D 11/0054* (2013.01); *E05D 5/0276* (2013.01); *E05D 2011/0072* (2013.01)

(58) Field of Classification Search
CPC ......... E05D 11/0054; E05D 2011/0063; E05D 2011/0072; E05D 3/122; E05D 5/0276;
(Continued)

(56) References Cited

U.S. PATENT DOCUMENTS 2,586,757 A * 2/1952 Wummel ................ E05D 11/06 16/377
3,086,585 A * 4/1963 Stark ....................... E06B 3/481 160/183
(Continued)

FOREIGN PATENT DOCUMENTS

AT 521260 12/2019
CH 690336 A5 * 7/2000 ............. E06B 3/485
(Continued)

OTHER PUBLICATIONS

International Search Report dated Mar. 2, 2021 in International (PCT) Application No. PCT/AT2020/060449.
(Continued)

*Primary Examiner* — Chuck Y Mah
(74) *Attorney, Agent, or Firm* — Wenderoth, Lind & Ponack, L.L.P.

(57) ABSTRACT

An assembly includes a furniture hinge having a first fitting portion configured to be fixed to a first furniture part, a second fitting portion configured to be fixed to a second furniture part, and a hinge axis hingedly connecting the first fitting portion and the second fitting portion to one another. At least one cover is configured to at least partially cover a gap formed between the first fitting portion and the second fitting portion. A fastening device for fixing the cover to the furniture hinge is provided, and the fastening device includes an arresting device for fixing the fastening device on different positions of the cover in a longitudinal direction of the cover.

25 Claims, 6 Drawing Sheets

(58) Field of Classification Search
CPC ... E05C 17/54; E05Y 2900/132; E06B 7/367; E06B 7/36; E06B 7/232; E06B 7/362
See application file for complete search history.

(56) References Cited

U.S. PATENT DOCUMENTS

| | | | | |
|---|---|---|---|---|
| 3,893,269 | A * | 7/1975 | Nelsson | E04B 2/62 52/277 |
| 4,222,428 | A * | 9/1980 | Scherer | E05D 15/26 160/231.1 |
| 6,134,839 | A * | 10/2000 | Johansson | E06B 7/367 16/258 |
| 7,861,465 | B1 * | 1/2011 | Christ | E06B 7/367 49/506 |
| 8,387,213 | B2 | 3/2013 | Brunnmayr | |
| 8,572,810 | B2 | 11/2013 | Brunnmayr | |
| 8,661,620 | B2 | 3/2014 | Brunnmayr | |
| 8,667,647 | B2 | 3/2014 | Brunnmayr | |
| 9,097,046 | B2 * | 8/2015 | Baer | E05D 11/0054 |
| 9,376,847 | B2 | 6/2016 | Salice | |
| RE46,089 | E | 8/2016 | Brunnmayr | |
| 9,664,215 | B2 | 5/2017 | Laird et al. | |
| 10,914,106 | B2 | 2/2021 | Salice | |
| 11,512,513 | B2 | 11/2022 | Gasser | |
| 11,525,295 | B2 | 12/2022 | Nordieker et al. | |
| 2004/0107647 | A1 * | 6/2004 | Salzman | E06B 7/367 49/462 |
| 2011/0214355 | A1 * | 9/2011 | Kim | E05D 11/0054 16/223 |
| 2011/0291538 | A1 | 12/2011 | Brunnmayr | |
| 2013/0139352 | A1 | 6/2013 | Brunnmayr | |
| 2013/0139353 | A1 | 6/2013 | Brunnmayr | |
| 2013/0139354 | A1 | 6/2013 | Brunnmayr | |
| 2015/0135479 | A1 | 5/2015 | Salice | |
| 2015/0330127 | A1 * | 11/2015 | Lee | E05D 5/0223 16/250 |
| 2016/0145921 | A1 | 5/2016 | Laird et al. | |
| 2017/0260784 | A1 | 9/2017 | Laird et al. | |
| 2018/0266175 | A1 | 9/2018 | York | |
| 2018/0274287 | A1 * | 9/2018 | Dintheer | E06B 7/36 |
| 2019/0242167 | A1 | 8/2019 | Salice | |
| 2019/0383075 | A1 * | 12/2019 | Shin | E05D 11/0054 |
| 2020/0002989 | A1 * | 1/2020 | Bescherer-Nachtmann | B23K 26/706 |
| 2020/0011105 | A1 | 1/2020 | Gasser | |
| 2021/0010311 | A1 | 1/2021 | Nordieker et al. | |
| 2021/0115715 | A1 * | 4/2021 | Kaspersen | E05D 3/02 |
| 2021/0246700 | A1 | 8/2021 | Hoffman | |

FOREIGN PATENT DOCUMENTS

| | | | | |
|---|---|---|---|---|
| CN | 104120938 | | 10/2014 | |
| CN | 104234569 | | 12/2014 | |
| CN | 205531876 | | 8/2016 | |
| CN | 206128952 | | 4/2017 | |
| CN | 110573689 | | 12/2019 | |
| DE | 198 15 826 | | 9/1999 | |
| DE | 3121900 | A1 * | 9/2014 | |
| DE | 202018101518 | U1 * | 11/2018 | E06B 7/36 |
| DK | 20 2010 094 | | 3/2012 | |
| FR | 2523199 | A * | 9/1983 | E06B 7/367 |
| JP | H0813933 | A * | 1/1996 | |
| JP | 2009293304 | A * | 12/2009 | |
| JP | 2010-84405 | | 4/2010 | |
| JP | 5175676 | | 4/2013 | |
| JP | 5604133 | B2 * | 10/2014 | |
| JP | 2019-196636 | | 11/2019 | |
| KR | 101436801 | B1 * | 9/2014 | |
| TW | 201814129 | | 4/2018 | |
| WO | 2018/192819 | | 10/2018 | |
| WO | 2018/204945 | | 11/2018 | |

OTHER PUBLICATIONS

Chinese Search Report dated Dec. 11, 2020 in International Application No. 202080088154.4, with English-language translation.

* cited by examiner

A

ASSEMBLY COMPRISING A FURNITURE HINGE AND A COVERING

BACKGROUND OF THE INVENTION

The present invention relates to an assembly, comprising:

at least one furniture hinge, the at least one furniture hinge having a first fitting portion configured to be fixed to a first furniture part, a second fitting portion configured to be fixed to a second furniture part, and at least one hinge axis hingedly connecting the first fitting portion and the second fitting portion to one another, and at least one cover configured to at least partially cover a gap formed between the first fitting portion and the second fitting portion.

Moreover, the invention relates to an item of furniture comprising a furniture carcass and at least two furniture parts movable relative to the furniture carcass, the at least two furniture parts being hingedly connected to one another by at least one furniture hinge of the assembly of the type to be described.

WO 2018/204945 A1 discloses a furniture hinge for hingedly connecting two door wings, and a gap formed between the door wings can be covered by a cover. The furniture hinge includes a bearing body with guides into which the cover can be slid or snapped-on in order to fix the cover to the furniture hinge. A drawback of this construction is the fact that mounting and demounting of the cover to and from the furniture hinge is relatively difficult. In order to prevent a sagging movement of the cover in a mounted condition, the cover has to be fixed to the bearing body with a relatively large clamping force. This impedes the mounting of the cover on the bearing body on the one hand. On the other hand, the cover can only be again released with a considerable manual effort due to the large clamping force.

SUMMARY OF THE INVENTION

It is an object of the present invention to propose an assembly of the type mentioned in the introductory part, thereby avoiding the above-discussed drawbacks, and mounting and demounting of the cover to and from the furniture hinge shall be facilitated.

According to the invention, at least one fastening device for fixing the at least one cover to the at least one furniture hinge is provided, the at least one fastening device including an arresting device for fixing the at least one fastening device on different positions of the at least one cover in a longitudinal direction of the at least one cover.

According to an embodiment, the arresting device of the at least one fastening device includes a fixing screw for fixing the fastening device to the cover on different positions.

As an alternative thereto, it is possible that the fastening device is configured to be arranged on different positions along the cover in a self-locking manner. This can be provided, for example, in that the fastening device and the cover include tooth arrangements or corrugations configured to co-operate with one another, and the fastening device is displaceable along a longitudinal direction of the cover after having overcome a self-locking holding force.

According to an embodiment, the at least one fastening device is displaceably supported in the longitudinal direction of the cover. It can be preferably provided that each of the at least one fastening device and the at least one cover includes at least one linear guide for displaceably supporting the fastening device along the cover.

The at least one fastening device can include a coupling device for coupling the at least one fastening device, and therewith of the at least one cover, to the at least one furniture hinge. According to a constructively simple embodiment, the coupling device includes a recess and a pin configured to be inserted into the recess. The recess can be arranged on the fastening device and the pin is arranged on the furniture hinge. It can be particularly preferred that the pin is formed or arranged on the hinge axis of the furniture hinge.

The first fitting portion and/or the second fitting portion can include at least one supporting surface for supporting the at least one fastening device, so that a movement of the cover, in its mounted condition, along a longitudinal direction of the at least one hinge axis can be prevented.

The cover can be coupled to a relative movement of the fitting portions to one another. The cover can be at least partially movable about the at least one hinge axis upon a relative movement of the fitting portions to one another.

BRIEF DESCRIPTION OF THE DRAWINGS

Further details and advantages of the present invention will be explained with the aid of the following description of figures, in which.

DETAILED DESCRIPTION OF THE INVENTION

Figure 1A:
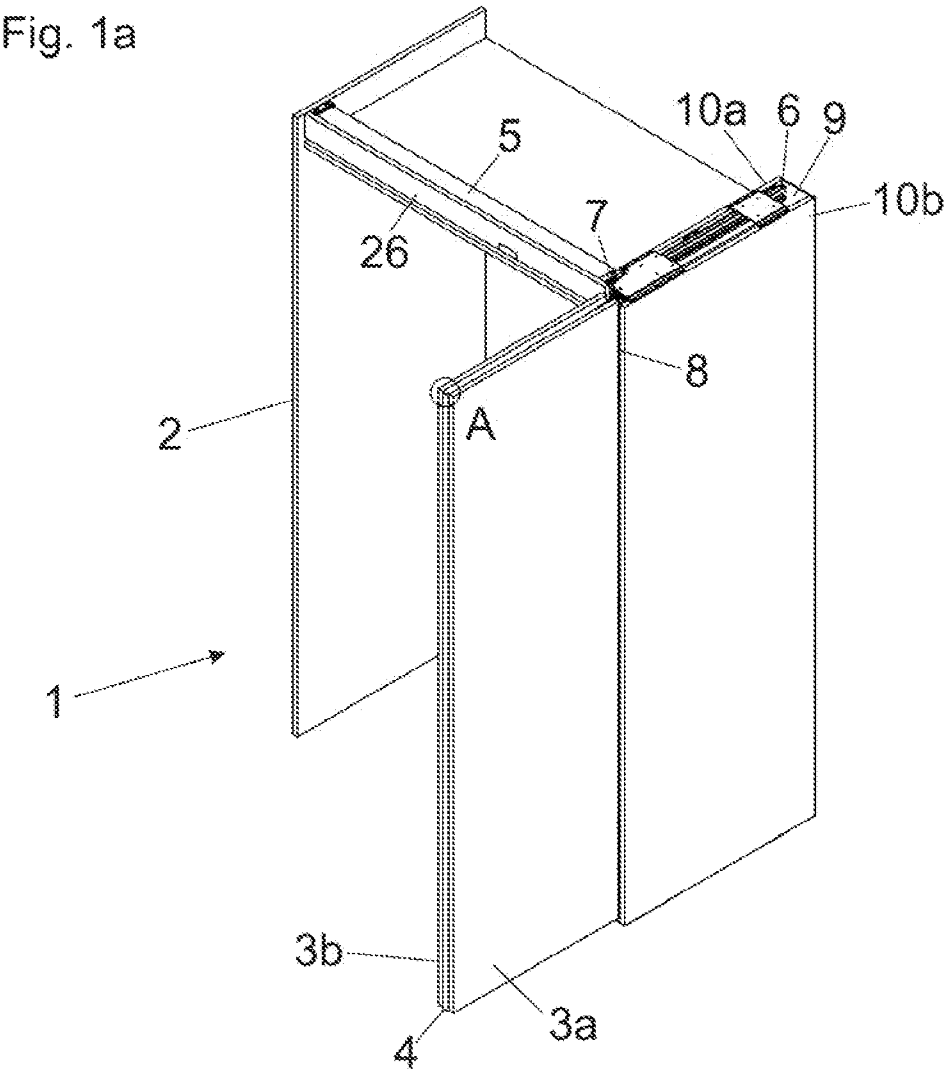
FIGS. 1a, 1b show a perspective view of an item of furniture comprising a furniture carcass and furniture parts movable thereto, and an enlarged detail view thereof.
Figure 3:
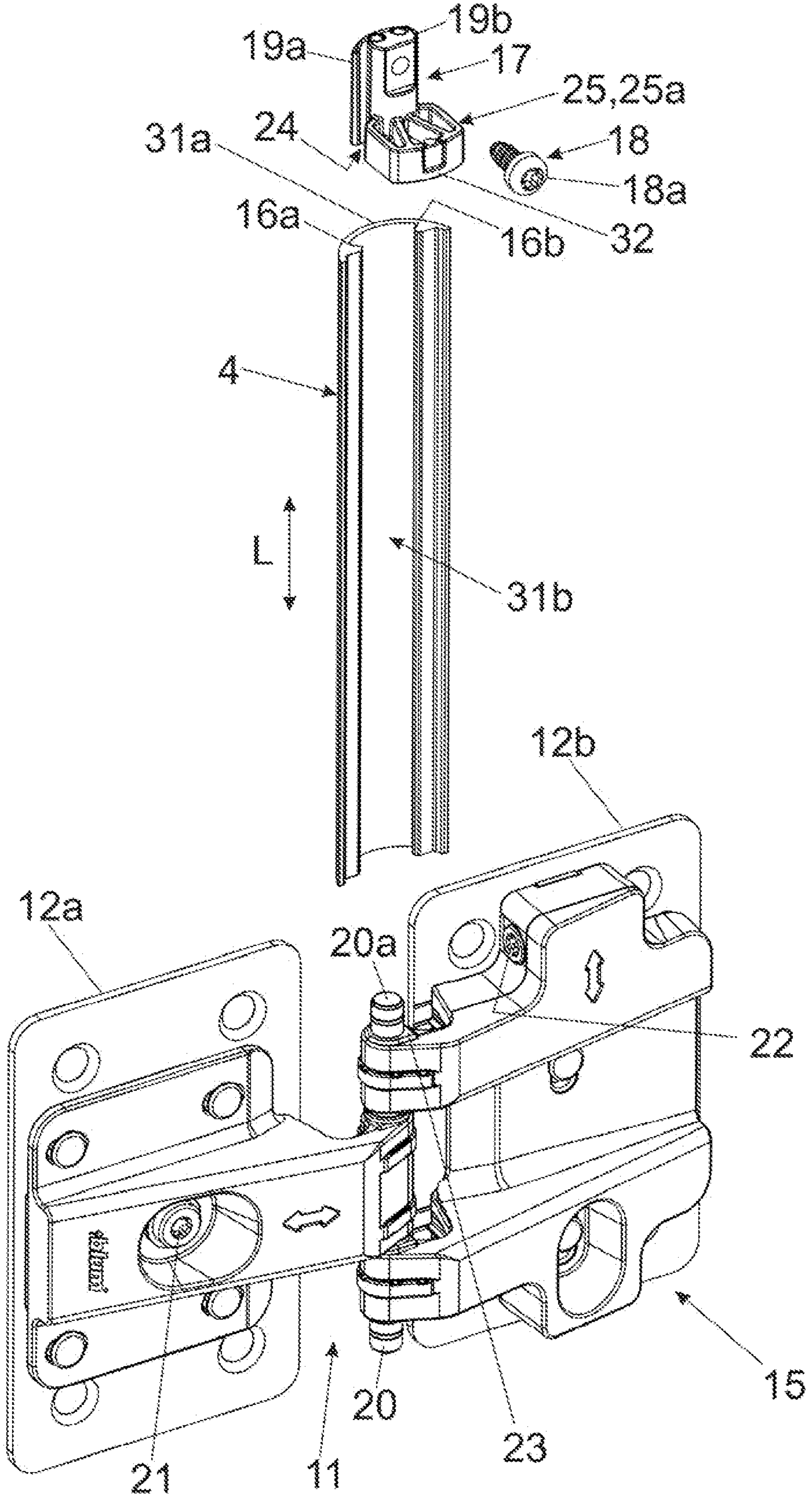
FIG. 3 shows the furniture hinge with the cover configured to be fixed thereon.

FIG. 1a shows a perspective view of an item of furniture 1 comprising a furniture carcass 2 and furniture parts 3a, 3b movable relative to the furniture carcass 2, the furniture parts 3a, 3b being in the form of door wings. The furniture parts 3a, 3b can be in the form of a sliding door or of a folding-sliding-door. In the shown embodiment, the furniture parts 3a, 3b are movable between a first position, in which the furniture parts 3a, 3b are aligned substantially coplanar to one another, and a second position, in which the furniture parts 3a, 3b are aligned substantially parallel to one another. In the first (coplanar) position of the furniture parts 3a, 3b, the furniture carcass 2 can be covered. In the shown second (parallel) position, the furniture parts 3a, 3b can be inserted into a lateral insertion compartment 9. The two furniture parts 3a, 3b are hingedly connected to one another by two or more furniture hinges 15 (not shown here) via at least one vertically extending hinge axis 20 (FIG. 3).

For guiding the furniture parts 3a, 3b, a first guide rail 5 is provided. The first guide rail 5 extends parallel to a front side of the furniture carcass 2 in a mounted condition and the first guide rail 5 can be covered by a blind 26. Moreover, a second guide rail 6 is provided, the second guide rail 6 extending transverse, preferably at a right angle, to the first guide rail 5 in a mounted condition. A running carriage 7 is hingedly connected to the second furniture part 3*b*, the running carriage 7 being displaceable along the first guide rail 5. By a longitudinal carrier 8 configured to be moved along the second guide rail 6, the two furniture parts 3*a*, 3*b* can be inserted into the lateral insertion compartment 9. The carrier 8 is movable into a transfer position in which the carrier 8 adjoins the first guide rail 5 in a longitudinal direction so as to transfer the running carriage 7 connected to the second furniture part 3*b* to and from between the first guide rail 5 and the carrier 8. The first furniture part 3*a* is hingedly connected to the carrier 8. In the shown embodiment, the lateral insertion compartment 9 is formed by two mutually spaced sidewalls 10*a*, 10*b* of the furniture carcass 2.

Figure 1B:
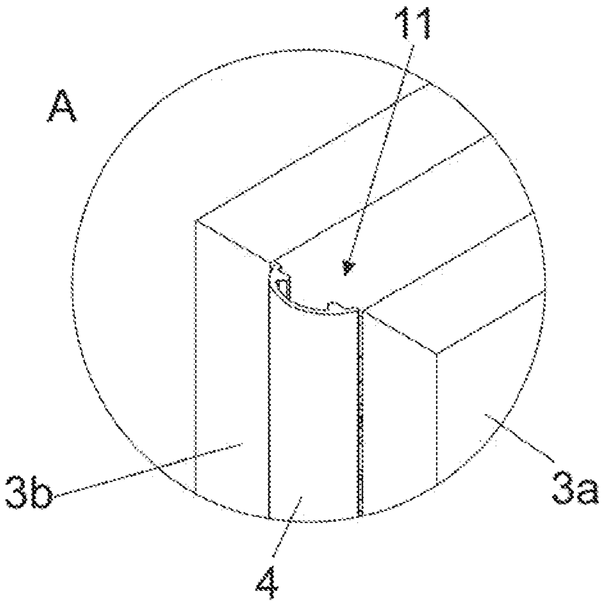

FIG. 1*b* shows the encircled region "A" of FIG. 1*a* in an enlarged view. By a cover 4, a gap 11 formed between the furniture parts 3*a*, 3*b* aligned in parallel relationship to one another can be at least partially covered. The cover 4, which preferably consists of metal or plastic, can extend substantially over an entire height of the furniture parts 3*a*, 3*b*. The cover 4 has a shell surface which, in a cross-section extending perpendicular to the longitudinal direction (L) of the cover 4, can be curved-shaped. The, preferably curved-shaped, shell surface of the cover 4, in a parallel position of the furniture parts 3*a*, 3*b* to one another, protrudes over the narrow sides of the furniture parts 3*a*, 3*b*. By the cover 4, a possible engagement of fingers into the gap 11 can be prevented, the ingress of dirt can be reduced, and an attractive visual appearance can be provided.

Figure 2A:
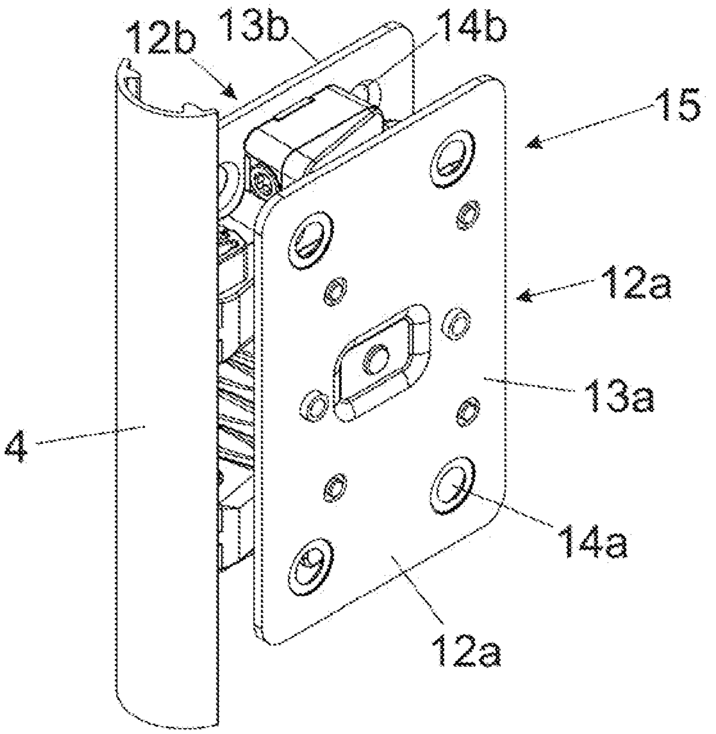
FIGS. 2a, 2b show a possible embodiment of a furniture hinge in two different relative positions of the fitting portions to one another.

FIG. 2*a* shows a possible embodiment of a furniture hinge 15 for hingedly connecting the two furniture parts 3*a*, 3*b*. The furniture hinge 15 includes a first fitting portion 12*a* configured to be fixed to the first furniture part 3*a*, and a second fitting portion 12*b* configured to be fixed to the second furniture part 3*b*, the second fitting portion 12*b* being hingedly connected to the first fitting portion 12*a*. The first fitting portion 12*a* includes a first fastening surface 13*a* configured to bear against the first furniture part 3*a*, and the second fitting portion 12*b* includes a second fastening surface 13*b* configured to bear against the second furniture part 3*b*. The fitting portions 12*a*, 12*b* can include at least one or a plurality of fastening locations 14*a*, 14*b* for fixing to the furniture parts 3*a*, 3*b*. For example, the fastening locations 14*a*, 14*b* can be in the form of holes for the passage of screws. The fastening locations 14*a*, 14*b* may also include at least one dowel configured to be fixed to the furniture parts 3*a*, 3*b*.

Figure 2B:
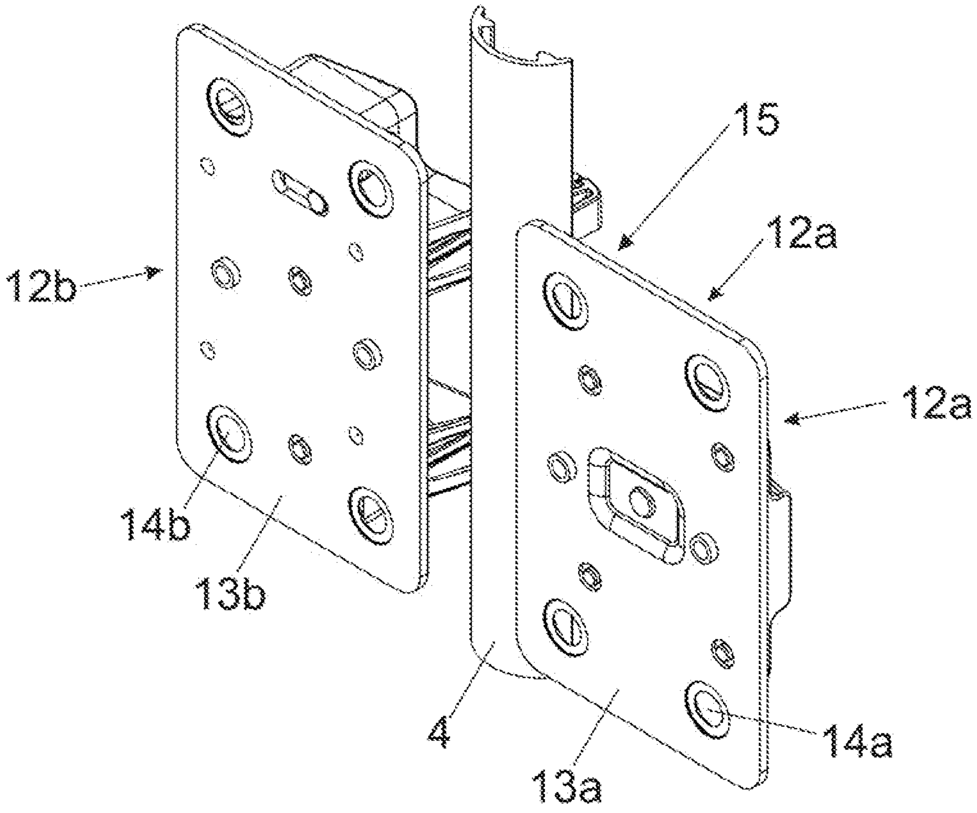

The fitting portions 12*a*, 12*b* of the furniture hinge 15 are movable relative to one another between a first position, in which the fastening surfaces 13*a*, 13*b* of the fitting portions 12*a*, 12*b* are aligned substantially coplanar to one another (FIG. 2*b*), and a second position, in which the fastening surfaces 13*a*, 13*b* of the fitting portions 12*a*, 12*b* are aligned substantially parallel to one another (FIG. 2*a*). The cover 4 can be configured to be coupled to a relative movement of the fitting portions 12*a*, 12*b* to one another, so that the cover 4, upon a relative movement of the fitting portions 12*a*, 12*b*, is at least partially movable about the hinge axis 20 (FIG. 3) connecting the fitting portions 12*a*, 12*b* to one another.

FIG. 3 shows the furniture hinge 15 with the fitting portions 12*a*, 12*b* which are pivotally connected to one another via at least one hinge axis 20. By a first adjustment device 21, the furniture parts 3*a*, 3*b*— in a mounted condition on the fitting portions 12*a*, 12*b*—can be adjusted relative to one another in a lateral direction. By a second adjustment device 22, the furniture parts 3*a*, 3*b*—in a mounted condition on the fitting portions 12*a*, 12*b*—can be adjusted relative to one another in a height direction. By the cover 4, the gap 11 formed between the fitting portions 12*a*, 12*b* can be at least partially covered.

The cover 4 has a longitudinal direction (L), and a shell surface of the cover 4, in a cross-section extending perpendicular to the longitudinal direction (L), can be curved-shaped, preferably partially cylindrically. The cover 4 can include at least one linear guide 16*a*, 16*b* for displacing a fastening device 17 along the cover 4, the fastening device 17 being provided for fastening the cover 4 to the furniture hinge 15. The fastening device 17 also includes at least one linear guide 19*a*, 19*b* configured to co-operate with the linear guides 16*a*, 16*b* of the cover 4. The fastening device 17 includes an arresting device 18 for fixing the fastening device 17 in the longitudinal direction (L) of the cover 4 on different positions. The arresting device 18 may include at least one fixing screw 18*a* for fixing the fastening device 17 to the cover 4 in a clamping manner.

In a first mounting step, the fastening device 17 is thus pre-positioned along the cover 4. Subsequently, the fastening device 17 is fixed to the cover 4 by the arresting device 18. The precise position of the fastening device 17 on the cover 4 can be determined, for example, by measuring.

The fastening device 17 further includes a coupling device 24 for coupling the fastening device 17, and therewith for coupling the cover 4, to the furniture hinge 15. The coupling device 24 can include a recess 24*a* (FIG. 4*a*) and a pin 20*a* configured to be inserted into the recess 24*a*. Preferably, the recess 24*a* is arranged on the fastening device 17 and the pin 20*a* is arranged on the furniture hinge 15. Further, the pin 20*a* can be formed or arranged on the hinge axis 20 of the furniture hinge 15. The longitudinal direction of the pin 20*a* and the longitudinal direction of the hinge axis 20 can extend coaxially to one another, or can be mutually spaced from one another in a parallel relationship.

For mounting the cover 4 to the furniture hinge 15, the recess 24*a* of the coupling device 24 is to be slid onto the pin 20*a*. Demounting of the cover 4 can be simply done, namely by lifting the cover 4 in its mounted condition on the furniture hinge 15, so as to separate the recess 24*a* of the coupling device 24 from the pin 20*a*.

The fastening device 17 further includes a limiting element 25 which, in a mounted condition of the fastening device 17 on the cover 4, protrudes in a direction towards the front. By the limiting element 25, a buckling movement of the furniture parts 3*a*, 3*b*, when the furniture parts 3*a*, 3*b* are located in a coplanar position to one another, can be limited in a direction of the depth of the furniture carcass 2. The function of the limiting element 25 will be later explained with the aid of FIGS. 6*a*-6*c*. Moreover, the limiting element 25 also serves as a handle, so that the fastening device 17, by a manual actuation of the limiting element 25, can be easier positioned along the longitudinal direction (L) of the cover 4.

The first fitting portion 12*a* and/or the second fitting portion 12*b* can include at least one supporting surface 23 for supporting the at least one fastening device 17 on the furniture hinge 15, so that a movement of the cover 4 along a longitudinal direction of the at least one hinge axis 20 can be prevented. The cover 4 is to be fixed to at least two furniture hinges 15, separate from one another, via at least two fastening devices 17 separate from one another.

The fastening device 17 can include at least one limiting element 25 configured to limit a buckling movement of the two fitting portions 12*a*, 12*b* to one another. Preferably, the at least one limiting element 25 protrudes from the cover 4 in a mounted condition of the fastening device 17, preferably the cover 4 having an outer surface 31*a* and an inner surface 31*b* spaced from the outer surface 31*a* by a material thickness of the cover 4, and the cover 4 is configured to be fixed with the inner surface 31*a* to the two fitting portions 12*a*, 12*b* via the fastening device 17, and the limiting element 25 protrudes from the inner surface 31*b* of the cover 4, and/or includes at least one handle 25*a* for positioning the fastening device 17 along the longitudinal direction (L) of the cover 4, and/or includes at least one abutment surface 32 configured to be supported on a front face 33 (FIGS. 6*a*-6*c*) of a furniture carcass 2 in the course of the buckling movement of the two fitting portions 12*a*, 12*b* to one another.

According to a preferred embodiment, it can be provided that at least one of the fitting portions 12*a*, 12*b*, preferably both fitting portions 12*a*, 12*b*, in a mounted condition on the furniture parts 12*a*, 12*b*, is or are arranged entirely outside a material thickness of the furniture parts 3*a*, 3*b*. In this way, the furniture parts 3*a*, 3*b* need not to be provided with work-intensive recesses or bores for partially receiving the fitting portions 12*a*, 12*b*. Instead, the fitting portions 12*a*, 12*b* can be simply screwed to the furniture parts 3*a*, 3*b* for example.

Figure 4A:
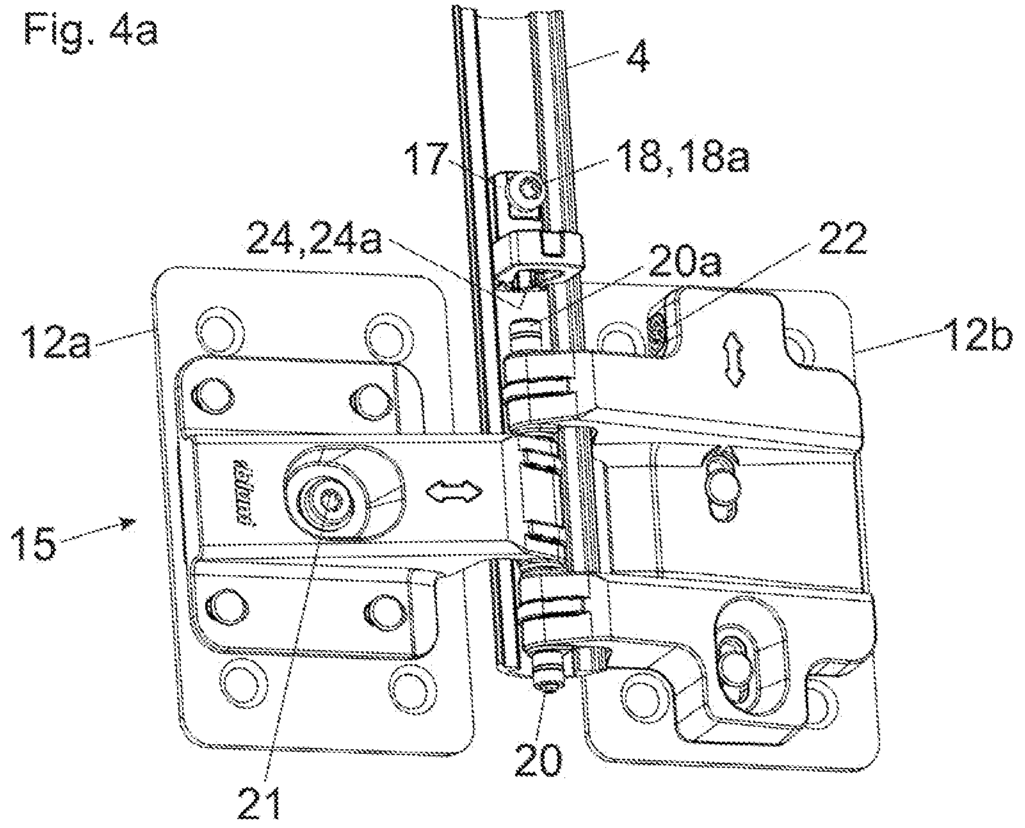
FIGS. 4a, 4b show the cover to be fixed to the furniture hinge and the cover fixed to the furniture hinge in perspective views.
Figure 4B:
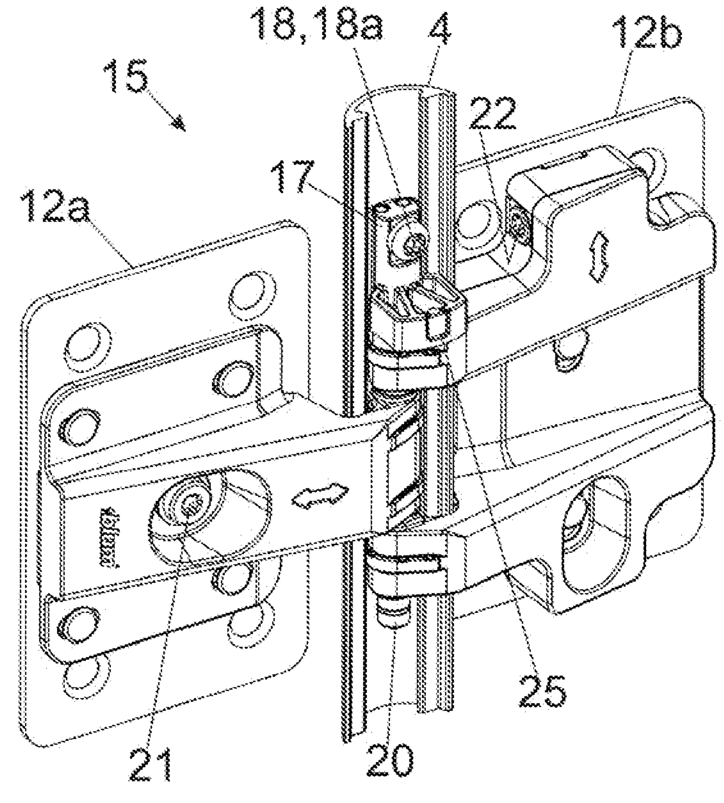

FIG. 4*a* shows a perspective view of the cover 4 which is to be fixed to the furniture hinge 15. The fastening device 17 is pre-mounted to the cover 4, and the coupling device 24 includes a recess 24*a* into which the pin 20*a* of the hinge axis 20 can be inserted. FIG. 4*b* shows the fixed condition of the cover 4 on the furniture hinge 15. By lifting the cover 4, the connection with the furniture hinge 15 can be again released.

Figure 5A:
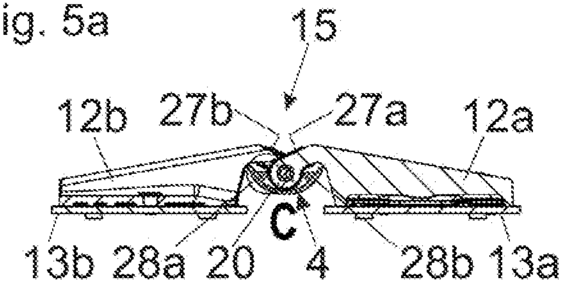
FIG. 5a-5h show a temporal sequence of a relative movement of the fitting portions to one another, and enlarged detail views thereof.

FIGS. 5*a*-5*h* show a temporal sequence of a relative movement of the fitting portions 12*a*, 12*b* to one another, and enlarged detail views thereof. In FIG. 5*a*, the fastening surfaces 13*a*, 13*b* are aligned substantially coplanar to one another. The cover 4 is pivotally supported about the hinge axis 20, and a movement of the cover 4 about the hinge axis 20 is coupled to a relative movement of the fitting portions 12*a*, 12*b*.

Figure 5B:
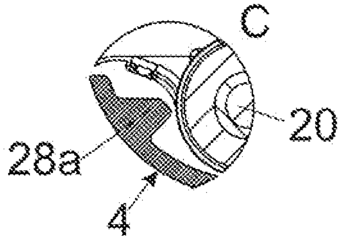

The first fitting portion 12*a* and/or the second fitting portion 12*b* includes or include at least one abutment 27*a*, 27*b*, whereas the cover 4 is provided with at least one counter-abutment 28*a*, 28*b*. The at least one abutment 27*a*, 27*b* of the first fitting portion 12*a* and/or of the second fitting portion 12*b* abuts against the at least one counter-abutment 28*a*, 28*b* of the cover 4 upon a relative movement of the fitting portions 12*a*, 12*b* to one another. The cover 4 is at least partially movable about the hinge axis 20 due to the at least one abutment 27*a*, 27*b* bearing against the at least one counter-abutment 28*a*, 28*b*. It can be seen that the cover 4, in the shown position in which the fastening surfaces 13*a*, 13*b* are aligned parallel to one another, is set back in a direction extending perpendicular to the fastening surfaces 13*a*, 13*b*. FIG. 5*b* shows the encircled region "C" of FIG. 5*a* in an enlarged view. It can be seen that the abutment 27*a* of the first fitting portion 12*a* is yet spaced from the counter-abutment 28*a* of the cover 4.

Figure 5C:
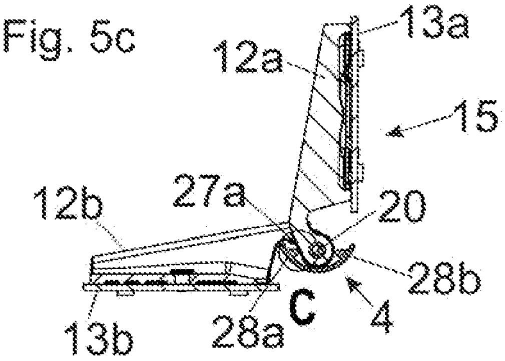
Figure 5D:
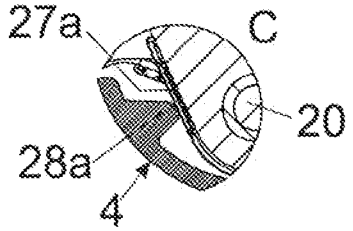

FIG. 5*c* shows a relative position of the fitting portions 12*a*, 12*b*, in which the fastening surfaces 13*a*, 13*b* of the fitting portions 12*a*, 12*b* are aligned substantially at a right angle to one another. It can be seen that the abutment 27*a* of the first fitting portion 12*a* abuts against the counter-abutment 28*a* of the cover 4. This initiates the beginning of a pivotal movement of the cover 4 about the hinge axis 20. FIG. 5*d* shows the encircled region "C" of FIG. 5*c* in an enlarged view.

Figure 5E:
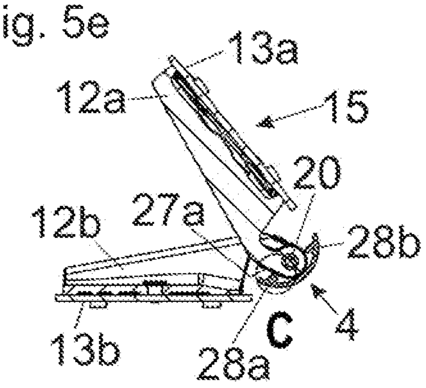
Figure 5F:
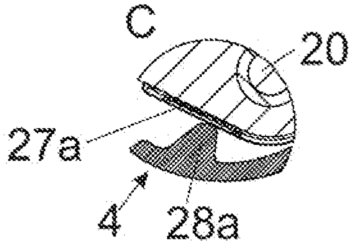

FIG. 5*e* shows a relative position of the fitting portions 12*a*, 12*b*, in which the fastening surfaces 13*a*, 13*b* of the fitting portions 12*a*, 12*b* are aligned at angle of approximately 50° to one another. Due to the abutment 27*a* bearing against the counter-abutment 28*a*, the cover 4 can be moved about the hinge axis 20. FIG. 5*f* shows the encircled region "C" of FIG. 5*e* in an enlarged view.

Figure 5G:
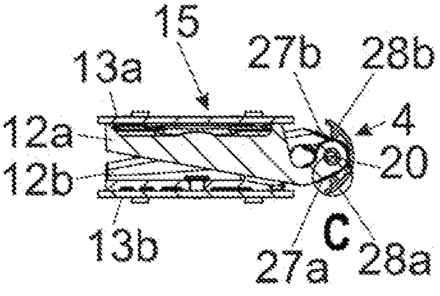
Figure 5H:
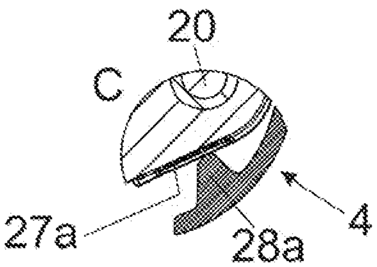

FIG. 5*g* shows a relative position of the fitting portions 12*a*, 12*b*, in which the fastening surfaces 13*a*, 13*b* of the fitting portions 12*a*, 12*b* extend parallel one another. In this position of the furniture hinge 15, the cover 4 protrudes in a direction extending parallel to the fastening surfaces 13*a*, 13*b*.

On the contrary, upon a movement of the furniture hinge 15 from the position shown in FIG. 5*g* in a direction of the position shown in FIG. 5*a*, the second abutment 27*b* of the second fitting portion 12*b* abuts against the second counter-abutment 28*b* of the cover 4, so that the cover 4 is pivoted about the hinge axis 20 in the opposite direction. However, the arrangement of the second abutment 27*b* and of the second counter-abutment 28*b* can be omitted by using, for example, at least one spring element configured to return the cover 4 in the opposite direction.

The at least one counter-abutment 28*a*, 28*b* of the cover 4 extends substantially parallel to the longitudinal direction (L) of the cover 4. It can be preferably provided that the at least one counter-abutment 28*a*, 28*b* extends over substantially an entire length of the cover 4. In the shown embodiment, the counter-abutments 28*a*, 28*b* of the cover 4, jointly with the linear guides 16*a*, 16*b* (FIG. 3) of the cover 4, are formed together so as to have an integral one-piece configuration.

Figure 6A:
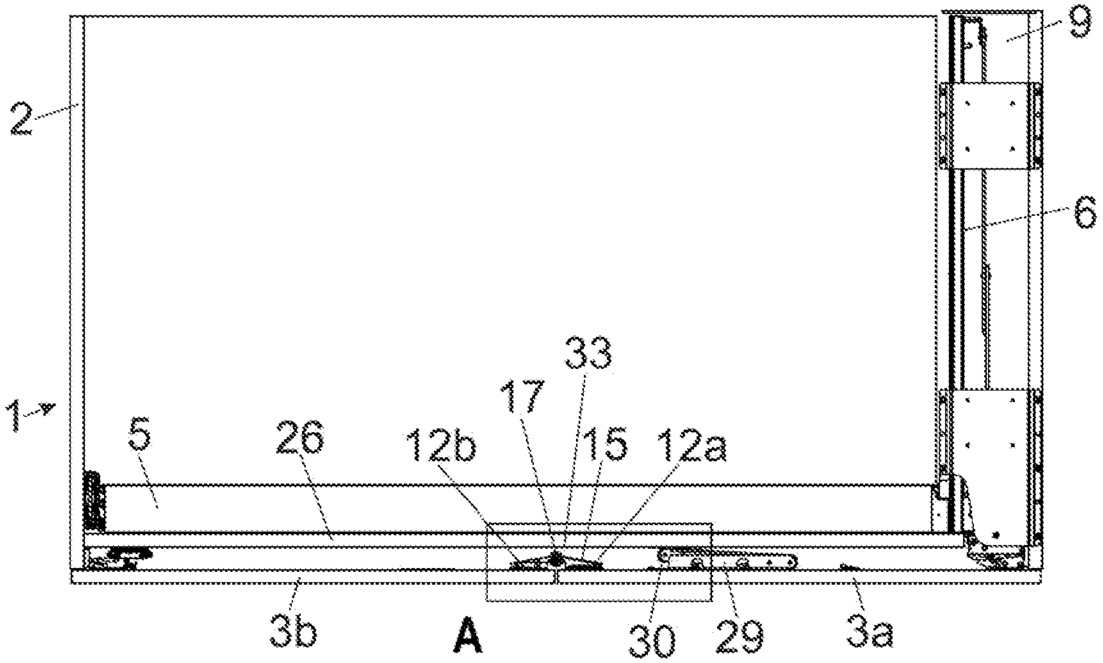
FIGS. 6a-6c show a top view onto the item of furniture according to FIG. 1a, and two different positions of the furniture parts to one another.

FIG. 6*a* shows the item of furniture 1 according to FIG. 1*a* in a top view, in which the furniture carcass 2 and the furniture parts 3*a*, 3*b* located in the coplanar position are shown. The transversely extending guide rails 5, 6 and the lateral insertion compartment 9 can be seen, and the furniture parts 3*a*, 3*a* can be inserted into the lateral insertion compartment 9 when aligned in a parallel position to one another. The furniture parts 3*a*, 3*b* are hingedly connected to one another via two or more furniture hinges 15.

An ejection device 29 is provided so as to eject the furniture parts 3*a*, 3*b* from the shown coplanar position into an angular position to one another. In the shown embodiment, the ejection device 29 is fixed to the first furniture part 3*a*, and a supporting roller 30 of the ejection device 29 is supportable on the blind 26 or on the first guide rail 5. The ejection device 29 preferably includes a Touch-Latch functionality, that is to say that the ejection device 29 is configured to be triggered by overpressing the furniture parts 3*a*, 3*b* from the shown coplanar closed position into an overpressing position lying behind the closed position. Such ejection devices 29 having a Touch-Latch functionality are commonly known and need not to be described in greater detail here.

Figure 6B:
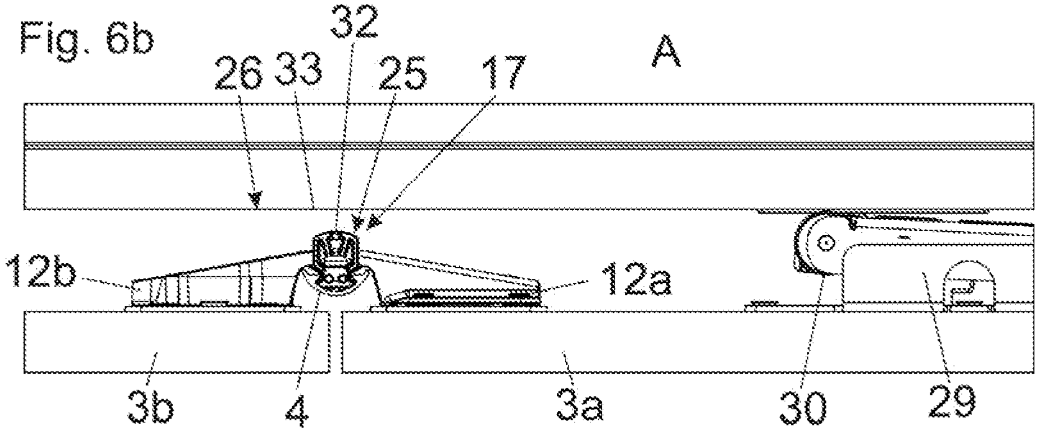
Figure 6C:
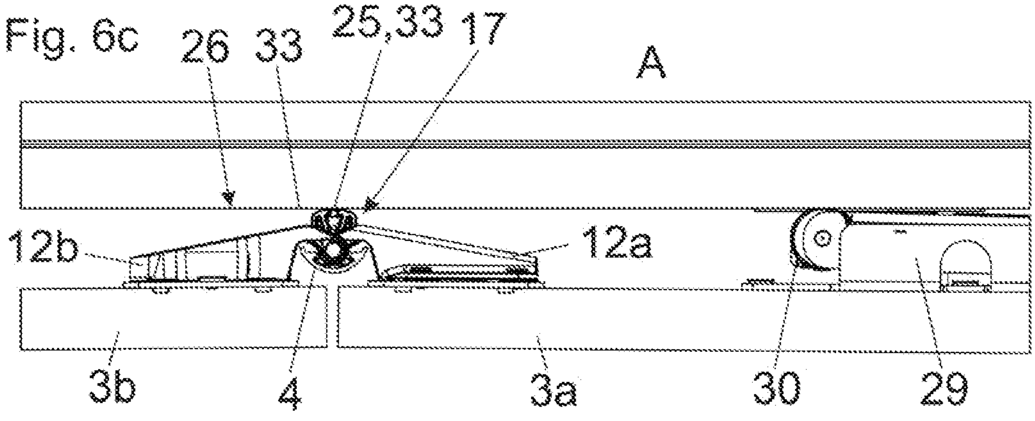

FIG. 6*b* shows the framed region "A" of FIG. 6*a* in an enlarged view. In the coplanar position of the furniture parts 3*a*, 3*b*, the limiting element 25 is slightly spaced from the blind 26, for example approximately 3 mm. When now the furniture parts 3*a*, 3*b* are pressed, in a region of the axis connecting the furniture parts 3*a*, 3*b* to one another, in a direction of the depth of the furniture carcass 2, the limiting element 25 abuts against the blind 26 (FIG. 6*c*) so as to prevent a further buckling movement of the furniture parts 3*a*, 3*b* in a direction of the depth of the furniture carcass 2. Therefore, a defined triggering path can be provided for the ejection device 29 having a Touch-Latch functionality, and the furniture parts 3*a*, 3*b* can be ejected by the ejection device 29 from the coplanar position over a partial distance in a direction of the parallel position.

The invention claimed is:

1. An assembly comprising:

a furniture hinge including a first fitting portion configured to be fixed to a first furniture part, a second fitting portion configured to be fixed to a second furniture part, and a hinge axis hingedly connecting the first fitting portion and the second fitting portion to one another, a cover configured to at least partially cover a gap formed between the first fitting portion and the second fitting portion, and a fastening device for fixing the cover to the furniture hinge, the fastening device including an arresting device for fixing the fastening device on different positions of the cover in a longitudinal direction of the cover, wherein the fastening device further includes a limiting element configured to limit a buckling movement of the first fitting portion and the second fitting portion.

2. The assembly according to claim 1, wherein the arresting device of the fastening device includes a fixing screw for fixing the fastening device to the cover.

3. The assembly according to claim 1, wherein the fastening device is displaceably supported in the longitudinal direction of the cover.

4. The assembly according to claim 3, wherein each of the fastening device and the cover includes a linear guide for displaceably supporting the fastening device along the cover.

5. The assembly according to claim 1, wherein the fastening device includes a coupling device for coupling the fastening device and the cover to the furniture hinge.

6. The assembly according to claim 5, wherein the coupling device includes a recess and a pin configured to be inserted into the recess.

7. The assembly according to claim 6, wherein the recess is arranged on the fastening device and the pin is arranged on the furniture hinge and on the hinge axis.

8. The assembly according to claim 1, wherein the first fitting portion and/or the second fitting portion includes an abutment surface for supporting the fastening device on the furniture hinge so as to prevent a movement of the cover along a longitudinal direction of the hinge axis.

9. The assembly according to claim 1, wherein the first fitting portion of the furniture hinge includes a first fastening surface configured to bear against the first furniture part, and the second fitting portion of the furniture hinge includes a second fastening surface configured to bear against the second furniture part, wherein the first fitting portion and the second fitting portion are movable relative to one another between a first position, in which the first fastening surface and the second fastening surface are aligned substantially coplanar to one another, and a second position, in which the first fastening surface and the second fastening surface are aligned substantially parallel to one another.

10. The assembly according to claim 9, wherein the cover is configured such that, when mounted on the furniture hinge, the cover is set back in a direction extending at a right angle to the fastening surfaces in the first position of the first fitting portion and the second fitting portion, and protrudes in a direction extending parallel to the fastening surfaces in the second position of the first fitting portion and the second fitting portion.

11. The assembly according to claim 1, wherein a shell surface of the cover, in a cross-section extending perpendicular to the longitudinal direction, is curved-shaped.

12. The assembly according to claim 11, wherein the shell surface of the cover is partially cylindrical.

13. The assembly according to claim 1, wherein the cover is mounted and configured such that a movement of the cover is coupled to a relative movement of the first fitting portion and the second fitting portion to one another.

14. The assembly according to claim 13, wherein the cover is mounted and configured such that, upon a relative movement of the first fitting portion and the second fitting portion to one another, the cover is movable about the hinge axis.

15. The assembly according to claim 1, wherein the first fitting portion and/or the second fitting portion includes an abutment, and the cover includes a counter-abutment, wherein the abutment of the first fitting portion and/or of the second fitting portion is configured to, upon a relative movement of the first fitting portion and the second fitting portion to one another, abut against the counter-abutment of the cover, and the cover, due to the abutment bearing against the counter-abutment, is movable about the hinge axis.

16. The assembly according to claim 15, wherein the counter-abutment of the cover extends substantially parallel to the longitudinal direction of the cover.

17. The assembly according to claim 16, wherein the counter-abutment of the cover extends substantially over an entire length of the cover.

18. The assembly according to claim 1, wherein the limiting element;

protrudes from the cover in a mounted condition of the fastening device, the cover having an outer surface and an inner surface spaced from the outer surface by a material thickness of the cover, the cover being configured to be fixed with the inner surface to the first fitting portion and the second fitting portion via the fastening device, wherein the limiting element protrudes from the inner surface of the cover, and/or includes a handle for positioning the fastening device along the longitudinal direction of the cover, and/or includes an abutment surface configured to be supported on a front face of a furniture carcass during the buckling movement of the first fitting portion and the second fitting portion.

19. The assembly according to claim 1, further comprising a first adjustment device configured to adjust the first fitting portion and the second fitting portion in a lateral direction to one another, and/or a second adjustment device configured to adjust the first fitting portion and the second fitting portion in a height direction to one another.

20. An item of furniture comprising:

a furniture carcass;

at least two furniture parts movable relative to the furniture carcass, and the assembly according to claim 1 hingedly connecting the at least two furniture parts to one another.

21. The item of furniture according to claim 20, further comprising a first guide rail and a second guide rail, the first guide rail being arranged substantially parallel to a front side of the furniture carcass, and the second guide rail extending transversely to the first guide rail.

22. The item of furniture according to claim 21, wherein the second guide rail extends at a right angle to the first guide rail.

23. The item of furniture according to claim 20, further comprising a carrier hingedly connected to one of the at least two furniture parts and displaceably supported in a depth direction of the furniture carcass.

24. The item of furniture according to claim 20, wherein at least one of the first fitting portion and the second fitting portion is arranged entirely outside a material thickness of the at least two furniture parts when mounted on the at least two furniture parts.

25. The item of furniture according to claim 24, wherein both of the first fitting portion and the second fitting portion are arranged entirely outside a material thickness of the at least two furniture parts when mounted on the at least two furniture parts.

* * * * *